United States Patent [19]

Schmidt, Jr. et al.

[11] Patent Number: 5,071,457
[45] Date of Patent: Dec. 10, 1991

[54] COMPOSITE FOR FILTERING HOT GAS AND METHOD OF ITS MANUFACTURE

[75] Inventors: Henry Schmidt, Jr., Hinsdale; James F. Zievers, LaGrange; Paul Eggerstedt, North Riverside, all of Ill.

[73] Assignee: Industrial Filter & Pump Mfg. Co., Cicero, Ill.

[21] Appl. No.: 19,754

[22] Filed: Feb. 27, 1987

Related U.S. Application Data

[63] Continuation-in-part of Ser. No. 801,286, Nov. 25, 1985, abandoned.

[51] Int. Cl.⁵ .................... C02B 41/87; B01D 39/20
[52] U.S. Cl. ........................................ 55/523; 55/524; 55/DIG. 5; 264/62; 264/63
[58] Field of Search ............... 55/512, 523, 524; 210/490, 510.1; 264/56, 60, 62, 63

[56] References Cited

U.S. PATENT DOCUMENTS

| | | | |
|---|---|---|---|
| 1,193,335 | 8/1916 | Acheson | 210/510.1 X |
| 2,114,748 | 4/1938 | Prausnitz | 210/510.1 X |
| 2,267,918 | 12/1941 | Hildabolt | 210/510.1 X |
| 2,293,843 | 8/1942 | Marvin | 210/510.1 X |
| 2,597,217 | 5/1952 | Zenick | 210/510.1 X |
| 4,186,100 | 1/1980 | Mott | 210/510.1 X |
| 4,256,470 | 3/1981 | Zajicek et al. | 210/510.1 X |
| 4,342,574 | 8/1982 | Fetzer | 55/524 X |
| 4,364,760 | 12/1982 | Higuchi et al. | 55/523 |
| 4,381,998 | 5/1983 | Roberts et al. | 210/510.1 X |
| 4,441,899 | 4/1984 | Takagi et al. | 210/510.1 X |
| 4,528,099 | 7/1985 | Rieger et al. | 210/510.1 X |
| 4,610,832 | 9/1986 | Brockmeyer | 210/510.1 X |
| 4,629,483 | 12/1986 | Stanton | 55/523 X |
| 4,647,376 | 3/1987 | Galaj | 210/510.1 X |
| 4,678,758 | 7/1987 | Kampfer et al. | 210/510.1 X |

FOREIGN PATENT DOCUMENTS

| | | | |
|---|---|---|---|
| 1030776 | 5/1958 | Fed. Rep. of Germany | 210/510.1 |
| 120217 | 7/1984 | Japan | 210/510.1 |

*Primary Examiner*—Robert Spitzer
*Attorney, Agent, or Firm*—Edmond T. Patnaude

[57] ABSTRACT

A composite filter element for filtering hot gasses is made up of a porous ceramic core to which a porous ceramic, thin outer layer is integrally bonded. The outer layer has a mean pore size which is at least several times smaller than the mean pore size of the substrate and the substrate is at least several times thicker than is the outer layer. The outer layer and the substrate are preferably formed of the same material or of two different materials having essentially the same coefficient of thermal expansion.

4 Claims, 1 Drawing Sheet

COMPOSITE FOR FILTERING HOT GAS AND METHOD OF ITS MANUFACTURE

The present invention relates in general to rigid, porous filter elements and it relates in particular to ceramic filters of the type used to remove fine particulates from hot gas streams exiting from, for example, low rad waste incinerators, pressurized fluidized bed combustors, coal gasifiers and the like and from certain liquid streams although the preferred embodiment which is hereinafter described is described in connection with the filtering of hot gas.

This is a continuation-in-part application of pending prior application Serial No. 06/801,286 filed on Nov. 25, 1985 by Henry Schmidt, Jr., James F. Zievers, and Paul Eggerstedt for a Composite Filter Element and Method of its Manufacture.

BACKGROUND OF THE INVENTION

In a typical installation utilizing ceramic filter elements of this general type, the particulate-laden gas stream is directed through one or more inertial separating devices such, for example, as cyclones, which remove the bulk of the particulate matter. The particle size distribution of solid material leaving the inertial separators is generally in the range of about 0.2 to 15 microns with the most commonly occurring size being about 4 microns. Such gas streams commonly have a temperature in excess of 1,600 degrees F., which accounts for the fact that porous ceramic material is currently the most durable filter material used for these applications.

A major problem associated with ceramic filters as well as with metal or plastic filters has been plugging of the filters. Other problems have been constructional in nature, i.e., the filter element itself must be resistant to thermal shock and must also be sufficiently strong to withstand rough handling during shipment, installation and overall filter maintenance.

As is known in the art, the denser the filter, i.e., the lower the mean pore size, the more effective is the filter in removing small size particles. It should be understood that the term "grade" of a porous ceramic element is commonly defined as the quantity of air (SCFM) that will pass through a 1 square foot surface area of the ceramic material with a thickness of one inch and a differential pressure of two inches of water. It may thus be seen that as the grade of the element decreases numerically so does the mean pore size of the element and so does the air flow through the filter element at a constant pressure differential. If, however, the grade of the ceramic filter section is increased, the effectiveness of the filter element to remove microscopic particles from the gas being filtered is decreased due to the increase in mean pore size. On the other hand as the pore size or "grade" of the porous ceramic element is decreased the resistance to gas flow through the filter element is increased. In addition, the resistance to gas flow through the filter element increases proportionally to the thickness of the filter element. It might appear that optimum filtration performance could be achieved by the use of a very thin and very tight filter element. However, such a filter element would inherently be too fragile for use in practical applications As a consequence, the filter elements of the prior art, whether designed for gas or liquid filtration, have been a design compromise between optimum pore size for efficient filtration and optimum thickness for strength and durability.

SUMMARY OF THE INVENTION

Briefly, there is provided in accordance with one aspect of the present invention a ceramic filter element having a relatively thick and relatively porous substrate to one surface of which a thin filter layer of a substantially finer grade of porous ceramic is integrally bonded. Preferably, the thin filter ceramic layer and the substantially thicker ceramic substrate are simultaneously fired to assure that the portions of different porosity are integrally united into a unified filter element which is virtually free of internal stresses when initially manufactured and when subjected to high temperatures and significant temperature shocks during use. The ceramic materials forming the substrate and the filter layer must have essentially the same coefficient of thermal expansion, and this characteristic may be assured by using the same ceramic material for both the substrate and the filter layer, only the pore sizes and wall thicknesses being different.

We have found that when a newly fired filter element is initially used, a substantial number of particles having a size about one-third the mean pore size of the filter layer pass through the filter element. However, as the filter element is subjected to repeated filter and cleaning cycles the number and size of particles which pass through the filter decreases until an equilibrium state is reached where further cycling of the filter element has no effect on the number or size of particles which will pass through the filter element at a given face velocity of gas through the filter. Examination of the filter elements has shown that when the filter element is first used particles having a size approximating one-third the mean pore size of the filter layer become trapped within the upstream portion of the filter layer, and during subsequent cycles smaller and smaller particles become trapped until the equilibrium state is reached and the effective mean pore size of the filter layer remains constant irrespective of the number of further cycles of the filter.

We have also found that after a filter element has reached the state of equilibrium the trapped particles have penetrated the filter layer to a maximum distance proportional to the mean pore size of the layer. Consequently, if the filter layer is any thicker than the maximum distance of particle penetration, no improved filtration results but there 0 is a greater pressure differential across the filter element and a reduced face velocity with a consequent reduction in operating efficiency. In addition, cleaning of the filter is also adversely affected if the filter layer is thicker than necessary. The optimum thickness of the filter layer is described in detail hereinafter.

In the composite filter element of this invention the thin filter layer does not become plugged as does the thicker-walled ceramic filters of the prior art, and in addition, the porous substrate functions as a flow distributor to provide uniform backflow through the filter layer during reverse flow cleaning of the filter.

In a preferred embodiment of the present invention the filter element is ceramic and of the candle type wherein the substrate constitutes a hollow cylindrical core portion and the filter layer constitutes a thin-walled hollow cylindrical outer layer which is integrally bonded to the core throughout the entire adjacent surface areas of the outer layer and the substrate.

Indeed, there is a thin intermediate layer between the substrate and the thin outer layer wherein the smaller particles which make up the outer layer are intermixed with the larger particles which make up the substrate thereby to form a thin boundary layer which maintains the unitary composite nature of the entire filter element.

In the candle construction, an external flange portion at one end and a plug portion at the other end, preferably formed of a nonporous ceramic to provide adequate structural strength, are used in those two areas where the stresses are greatest, and these portions are also simultaneously fired with the remainder of the filter element.

In an alternative embodiment of the invention the filter element may consist of a porous plastic substrate to which a finer grade of porous plastic is integrally bonded to form a unitary filter element. Such plastic materials as polyvinylchloride, polycarbonate, polypropylene and polystryene are suitable.

GENERAL DESCRIPTION OF THE DRAWING

The present invention will be better understood by a reading of the following detailed description taken in connection with the accompanying drawing wherein FIG. 1 is a partially sectioned elevational view of a filter element embodying the present invention;

Figure 4:
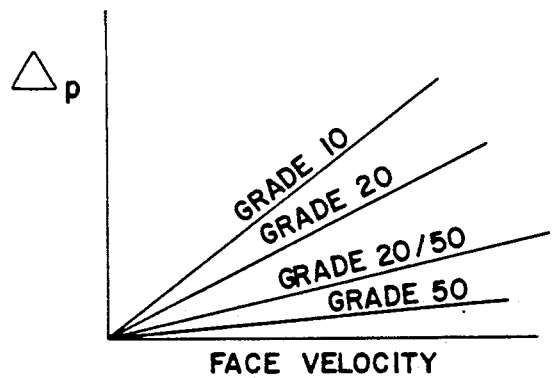
Figure 5:
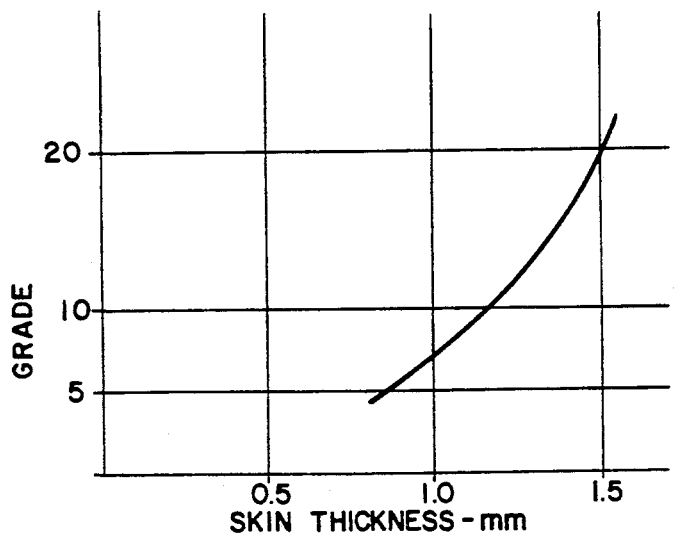

FIG. 4 is a graph showing the relationship between the face velocity of a gas and pressure differential across ceramic filters of different grade sizes; and FIG. 5 is a graph based on silicon carbide material showing the approximate relationship between the optimum maximum thickness of the filter layer and the mean pore size of the filter layer. Similar relationships pertain for other ceramic materials such as mallite or aluminum oxide.

DETAILED DESCRIPTION OF THE INVENTION

Figure 1:
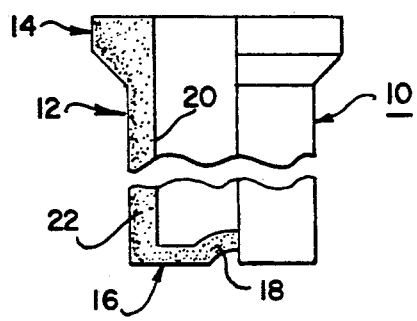

Referring now particularly to FIG. 1 there is shown a candle filter 10 having an elongate tubular filter section 12, an external mounting and sealing flange section 14 at the top and a plug section 16 which extends completely across the lower end of the tubular filter section 12. The entire filter element 10 is a unitary composite ceramic or plastic member which for high temperature operation has the same coefficient of thermal expansion throughout its entirety. As is explained in greater detail hereinafter the tubular filter section 12 is porous to permit gas to pass through the filter section to cause the entrained particulate matter to be deposited at the upstream side of the filter section. Ordinarily, a gas to be filtered is passed from the outside to the inside of a candle filter and, therefore, the external surface of the filter section 12 constitutes the upstream side of the filter.

The flange section 14 at the upper end of the filter element 10 need not be porous inasmuch as the gas to be filtered is not passed through the flange section. Rather, the flange section 14 is used only to mount the filter to a tube sheet and to provide a hermetic seal between the upper end of the filter element 10 and the tube sheet to which it is mounted. Therefore, the flange section 14 must be capable of withstanding high mechanical stresses as occur when the filter element 10 is tightly locked in place in a mounting aperture in the tube sheet and when the entire system is subjected to rapid thermal changes which thermally stress the filter element.

The lower end plug portion 16 may be in coacting cooperative relationship with a conventional spacer element (not shown) located at the bottom of the filter element 10. It may be seen that a central recess 18 is provided at the bottom of the plug section 16. Its purpose is to receive an upstanding pin or locator element from a spacer assembly located beneath the filter element 10 to space the filter element 10 from a number of other similar filter elements mounted in the same filter tank. The plug section 16 is also formed of a ceramic but because its primary function is to close off the lower end of the filter, it need not be porous to the extent that gas will pass therethrough during normal operation of the filter. The plug section 16, must, of course, be sufficiently imperforate so as not to permit the particulates in the gas to be filtered to bypass the filter section 12.

The filter section 12 includes a porous ceramic substrate portion 20 to the upstream side of which a porous ceramic coating layer 22 is integrally bonded throughout the entire adjacent surface areas of the substrate and the coating layer. The mean pore size of the substrate section 20 is appreciably greater than the mean pore size of the coating layer 22 wherefore the coating layer 22 functions as the filter media which collects the particulates as the gas flows through the filter section 12. The coating layer has a thickness which is sufficiently great to remove the entrained particles from the gas but which is sufficiently thin to provide a relatively low pressure differential thereacross during normal use of the filter. The relationship between the optimum thickness and the grade of the coating layer is described hereinafter in connection with FIG. 5. Where desired, the tubular substrate 20 may constitute the external surface of the filter tube with the filter layer 22 being coated onto the internal surface of the substrate.

Figure 2:
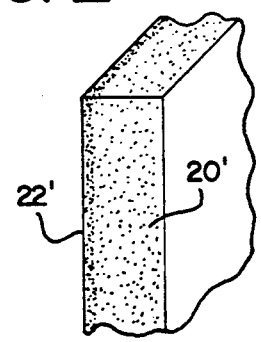
FIG. 2 is a fragmentary view of another filter element embodying the present invention.

In FIG. 2 there is shown a plate-like filter element embodying the present invention. A thin filtering layer 22' is integrally bonded to a substrate 20' in the same manner as the layer 22 is bonded to the substrate 20. The substrate 20' and the filtering layer 22' may both be formed of ceramic or of a suitable porous plastic material.

Figure 3:
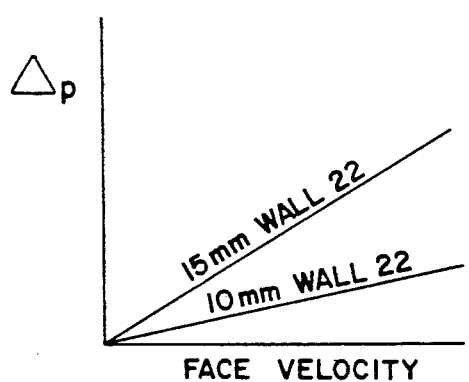
FIG. 3 is a graph showing the relationship between face velocity and pressure differential across porous ceramic candle filters of the prior art and across the type of filters embodying the present invention.

Referring to the graph shown in FIG. 3, it may be seen that the pressure differential across a fifteen millimeter wall of a given ceramic material is substantially greater than the pressure differential across a ten millimeter wall of the same material. For both materials, as the face velocity is increased the pressure drop across the wall also increases. It may thus be seen that if the filter layer or wall 22 of the filter 10 were sufficiently thick to enable the element 10 to be sufficiently strong for practical applications the pressure drop across the filter element would be so great as to require relatively higher pressures to force the gas through the filter elements.

Referring to FIG. 4, it may be seen that by increasing the mean pore size or grade of the filter section the pressure drop across the filter section is reduced. In accordance with the present invention the substrate 20 is formed of a relatively coarse grade of ceramic material and the filter layer 22 is formed of a substantially finer grade of ceramic material. In FIG. 4, the curve identified as "grade 50/20" shows the relationship between the face velocity and the pressure drop across a composite filter section wherein the coating layer is formed of grade 20 ceramic material and the substrate section 20 is formed of grade 50 ceramic material. In this composite filter element, the thin filter layer 22 functions to remove the fine particulates from the gas stream and the thick substrate section functions as the mechanical support for the coating layer 22 and the distributor during backwashing of the filter layer resulting in a particle retention approaching that of a grade 20 ceramic element without the corresponding pressure drop.

The substrate section 20 and the coating layer 22 are preferably formed of the same ceramic material although two different ceramic materials having substantially the same coefficient of thermal expansion can be used. When the element 10 is manufactured, the green ceramic materials, i.e., ceramic powder and a binder used for the flange 14, the lower end section 16 and the filter section 12 are compressed together in a mold having a shape which is complementary to the shape of the desired filter element to compact the different parts together prior to firing of the entire piece. Also a preferred core could be coated with the outer ceramic layer and again fired. As a consequence, a very thin intermediate section is formed between the substrate 20 and the outer layer 22 wherein the smaller particles which make up the outer layer are intermixed with the larger particles which make up the substrate. When the entire filter element 10 is thereafter fired, a unitary composite ceramic candle is provided and this candle is virtually free of internal stresses.

There are other methods of manufacturing which we have found to provide a satisfactory composite filter element. For example, the thin outer layer may be applied to the substrate by brushing or spraying a slurry of the fine ceramic particulates onto the substrate and then firing the coated substrate.

There are also several thermal techniques which may be used for applying the thin outer layer to the substrate. In one such system the coating media is heated just to the melt point by feeding it through a gun and heating it with oxy-acetylene or hydrogen flame and then propelling the molten softened particles with an aspirating gas onto the substrate. The nature of the coating will vary with the distance between the gun and the substrate and with the melting temperature, which is generally below 5,000 degrees F. Sputter coating or plasma coating can also be used. In plasma coating an inert gas stream was excited by an electric arc and the ceramic particulates were fed into the plasma flame and blown onto the substrate. An advantage of the plasma system is that it is less expensive.

Another system which has also been used successfully uses a binding material such as carboxy methyl cellulose which is coated onto the surface of a tubular substrate and permitted to dry until it becomes tacky. Then the coated tube is rolled in a mixture of the fine ceramic particles and carboxy methyl cellulose to apply a thin layer to the surface of the tubular substrate. The coated tube is then placed in a kiln and fired to cure the ceramic and to eliminate the binder.

In still another system a homogeneous slurry of the fine particulates is passed under pressure through the substrate until a cake of the fine particles having the desired thickness has been deposited on the substrate. The coated substrate is then placed in a kiln and fired.

It has been found that to achieve the advantages of the present invention the substrate should have a thickness of at least about three times the thickness of the coating layer and the substrate should have a mean pore size or grade which is at least two times the mean pore size or grade of the outer layer.

In order to maximize the operating efficiency of a composite filter element it is important to optimize the thickness and pore size of the filter layer. Inasmuch as the filter layer is the functional part of the filter element its pore size must be sufficiently small to prevent all particles of a size greater than the desired predetermined size to pass through the filter layer. However, each time a composite filter element is cycled, i.e., used as a filter and then cleaned, its effective mean pore size is decreased until a state of equilibrium is reached whereupon the effective mean pore size becomes constant and appreciably less than the initial mean pore size of the filter layer. For example, where the initial mean pore size is about 30 microns (grade 20), no particles larger in size than about 10 microns will initially pass through the filter, but after repeated cycles the filter reaches equilibrium and no particles larger in size than about 0.3 micron will pass through the filter. This is because small particles trapped in the filter layer have reduced its effective mean pore size. We have found that the filter layer should have an initial mean pore size about 2.5 times the mean size of the dust particles to be removed from the gas passed through the filter element.

We have found that the optimum thickness of the filter layer is dependent on the initial pore size of the filter layer and the relationship between initial grade and optimum thickness is shown in FIG. 5. While the thickness need not be precise, that being difficult and costly to achieve from a manufacturing standpoint, an economically satisfactory filter element is provided when the thickness of the filter layer is held within ±20 percent of the optimum thickness. The relationship between mean pore size and layer thickness shown in FIG. 5 can be expressed by the following equation:

$$\text{Grade} = 7.58t$$

wherein:
Grade is the grade of the filter layer
t is the thickness of the filter layer expressed in millimeters.

While many different types of ceramic material may be used in a filter element embodying the present invention, the materials selected will depend upon the temperatures at which the element is designed to operate as well as the desired particle size retention, allowable pressure differential and the strength and weight characteristics which are required. Materials which may be used for hot gas filtration applications are silicon carbide, aluminum oxide and mullite. Where the operating temperature of the filter element will not exceed about 400° C., the filter element may be formed of a quartz ceramic.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of manufacturing a monolithic filter tube having a porous inner cylindrical layer of ceramic bonded to a porous outer cylindrical layer of ceramic having a porosity different from that of said inner layer, an annular external mounting flange at one end and a gas impervious plug at the other end, comprising the steps of heating ceramic particles of a size less than said predetermined size to the melting point of said particles, propelling the molten particles onto the outer surface of said substrate to form a coating on said substrate, and then firing the coated substrate.

2. A method of manufacturing a monolithic filter tube having a porous inner cylindrical layer of ceramic bonded to a porous outer cylindrical layer of ceramic having a porosity different from that of said inner layer, an annular external mounting flange at one end and a gas impervious plug at the forming a tubular substrate of ceramic particles of a predetermined size, feeding ceramic particles smaller then said predetermined size into a plasma flame, then blowing said ceramic particles from said flame onto said tubular substrate to form a coating on said substrate, and then firing the coated substrate.

3. A method of manufacturing a monolithic filter tube having a porous inner cylindrical layer of ceramic bonded to a porous outer cylindrical layer of ceramic having a porosity different from that of said inner layer, an annular external mounting flange at one end and a gas impervious plug at the other end, comprising the steps of forming a tubular substrate of ceramic particles of a predetermined size, coating the outer surface of said substrate with a bonding material, applying to said coating a mixture of a bonding agent and ceramic particles smaller then said predetermined size to coat said substrate, and firing said coated substrate at a temperature greater than the vaporizing temperatures of said bonding agents.

4. A method of manufacturing a monolithic filter tube having a porous inner cylindrical layer of ceramic bonded to a porous outer cylindrical layer of ceramic having a porosity different from that of said inner layer, an annular external mounting flange at one end and a gas impervious plug at the other end, comprising the steps of forming a tubular substrate of ceramic particles of a predetermined size, providing a slurry of a liquid, a binder, and ceramic particles of a size less then said predetermined size, passing said slurry through said substrate until a layer of said ceramic particles of a size less then said predetermined size is deposited on the surface of said substrate, and then firing said substrate and said layer.

* * * * *